US012288179B2

(12) United States Patent
Petroulas

(10) Patent No.: US 12,288,179 B2
(45) Date of Patent: Apr. 29, 2025

(54) DYNAMIC LOGISTICS ENVIRONMENT

(71) Applicant: GRAND PERFORMANCE ONLINE PTY LTD, Sydney (AU)

(72) Inventor: Peter Petroulas, Sydney (AU)

(73) Assignee: GRAND PERFORMANCE ONLINE PTY LTD, Sydney (AU)

( * ) Notice: Subject to any disclaimer, the term of this patent is extended or adjusted under 35 U.S.C. 154(b) by 0 days.

(21) Appl. No.: 18/842,363

(22) PCT Filed: Dec. 20, 2023

(86) PCT No.: PCT/IB2023/063054
§ 371 (c)(1),
(2) Date: Aug. 28, 2024

(87) PCT Pub. No.: WO2024/134560
PCT Pub. Date: Jun. 27, 2024

(65) Prior Publication Data
US 2025/0111326 A1    Apr. 3, 2025

Related U.S. Application Data

(60) Provisional application No. 63/476,374, filed on Dec. 20, 2022.

(51) Int. Cl.
*G06Q 10/08*    (2024.01)
*G06Q 10/0631*    (2023.01)

(52) U.S. Cl.
CPC ....... *G06Q 10/08* (2013.01); *G06Q 10/06311* (2013.01); *G06Q 10/06312* (2013.01); *G06Q 10/06315* (2013.01)

(58) Field of Classification Search
CPC ............. G06Q 10/08; G06Q 10/06311; G06Q 10/06312; G06Q 10/06315
See application file for complete search history.

(56) References Cited

U.S. PATENT DOCUMENTS

| 11,461,707 B2 | 10/2022 | Petroulas |
| 2018/0089597 A1 | 3/2018 | Takahashi et al. |
| 2020/0387154 A1 | 12/2020 | Sellner |

FOREIGN PATENT DOCUMENTS

| JP | 2022-035999 | 3/2022 |
| KR | 10-2021-0108479 A | 9/2021 |

OTHER PUBLICATIONS

International Search Report and Written Opinion of the International Searching Authority received in PCT/IB2023/063054, mailed Apr. 4, 2024 (9 pgs.).

*Primary Examiner* — A. Hunter Wilder
(74) *Attorney, Agent, or Firm* — Finnegan, Henderson, Farabow, Garrett & Dunner, LLP

(57) ABSTRACT

A dynamic reconfigurable logistics environment can be combined with autonomous systems using a space-time volume-based resource allocation approach that permits dynamically changing paths of travel. This approach can enable a more flexible approach to the dynamic real-time reallocation of unused, unlocked resources whenever new resource requests are received, preventing blocking of later-received, more-difficult-to-allocate requests by earlier-received, less-difficult-to-allocate requests such that all resources as well as the paths of travel remain changeable and dynamic. Resource allocations can be subject to an autonomous system condition check, which can determine whether autonomous systems can perform tasks associated with the allocated resources, given the spatial layout of the resource and pathway allocation. An execution component can management the performance of the tasks by the autonomous systems within the dynamically changing environment. The tasks can be prioritized, and the autonomous systems can perform the tasks according that prioritization.

57 Claims, 8 Drawing Sheets

FIG 2A
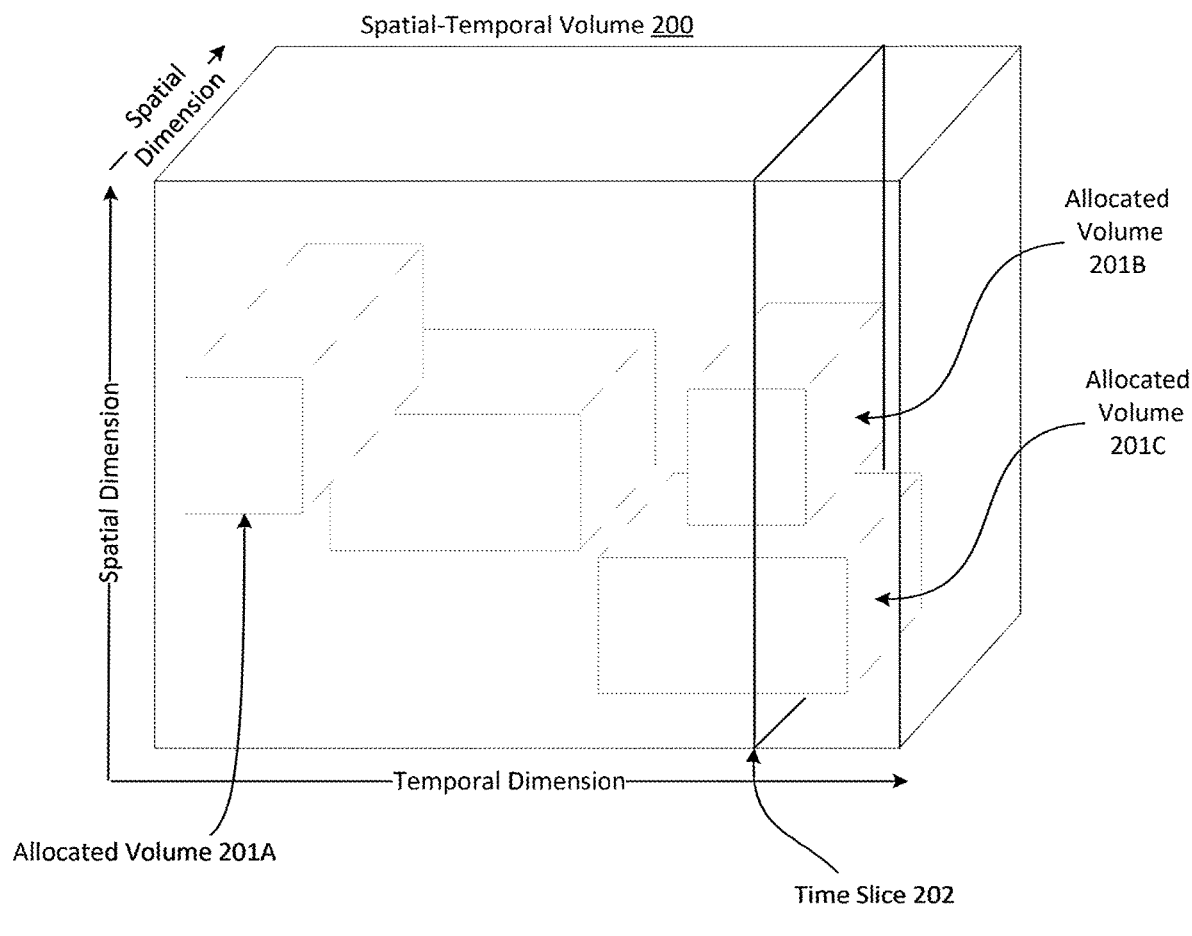
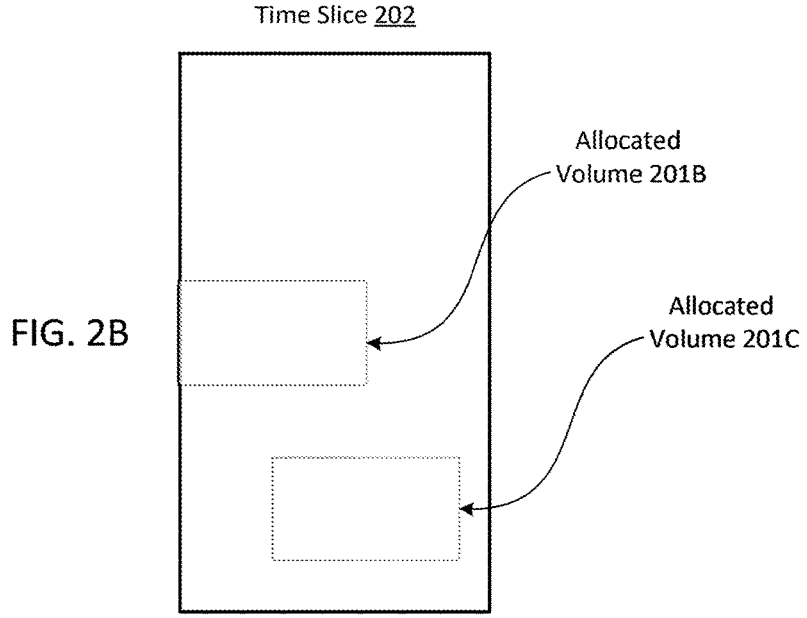
FIG. 2B

DYNAMIC LOGISTICS ENVIRONMENT

CROSS-REFERENCE TO RELATED APPLICATIONS

This application is a U.S. national stage entry under 35 U.S.C. § 371 of international application no. PCT/IB2023/063054, filed Dec. 20, 2023, which designates the U.S. and claims the benefit of U.S. Provisional Application No. 63/476,374, filed Dec. 20, 2022. This provisional application is incorporated herein by reference in its entirety.

TECHNICAL FIELD

The present disclosure relates to dynamically reconfigurable logistics environments suitable for use with logistics systems.

BACKGROUND

The use of logistics systems such as autonomous mobile transporters, service robots, security robots, and the like can dramatically improve the efficiency of logistics systems. The ability to dynamically reconfigure logistics environments (e.g., docks, warehouses, restaurants, distribution centers, and the like) can improve the flexibility and efficiency of such logistics environments. However, conventional approaches to using logistics systems in logistics environments may not support the use of logistics systems in reconfigurable logistics environments. Conventional systems may therefore fail to achieve the combined benefits arising from such a combination of approaches.

SUMMARY OF THE DISCLOSURE

The disclosed embodiments concern the management of dynamically reconfigurable logistics environments.

The disclosed embodiments include a system for management of a logistics environment. The system can include at least one processor and at least one non-transitory, computer-readable medium containing instructions that, when executed by the at least one processor, cause the system to perform operations. The operations can include providing a graphical user interface to a client system. The graphical user interface can include a display of a time slice in a spatial-temporal volume corresponding to the logistics environment. The spatial-temporal volume can contain resource allocation volumes. The spatial-temporal volume can be generated at least in part by obtaining a resource request and generating a corresponding first resource allocation volume, allocating resource allocation volumes within the spatial-temporal volume, the resource allocation volumes including the first resource allocation volume, and determining a route map for autonomous systems based on the allocated resource allocation volumes. The display of the time slice includes the resource allocation volumes intersecting the time slice and the route map intersecting the time slice. The graphical user interface can further include a time control specifying a time of the time slice. The operations can further include detecting an interaction with the time control, the interaction specifying a new time, and automatically updating the display to depict a new time slice in the volume.

In some embodiments, the route map can depend on widths associated with the autonomous systems. In some embodiments, determining the route map can include determining tasks associated with the resource allocation volumes, and assigning autonomous systems to perform the tasks. In some embodiments, determining the route map can include determining that the assigned autonomous systems can reach primary or secondary task points associated with the tasks. In some embodiments, determining the route map can include assigning additional task points associated with the logistics environment. In some embodiments, determining the route map can include determining high-traffic locations based on the resource allocation volumes, and routing the autonomous systems through the high traffic locations. In some embodiments, a spatial extent of the resource allocation volume can depend on a party size. In some embodiments, a spatial extent or temporal extent of the resource allocation volume can depend on request characteristics. In some embodiments, the operations can further include detecting an interaction with a resource allocation volume displayed in the time slice, and locking the resource allocation volume based on the detected interaction. In some embodiments, allocating the resource allocation volumes within the spatial-temporal volume can include: identifying unused and unlocked resource allocation volumes, pooling and sorting the first resource allocation volume and the unused and unlocked resource allocation volumes by allocation priority, and iteratively reallocating the pooled and sorted first resource allocation volume and unused and unlocked resource allocation volumes.

The disclosed embodiments include another system for management of a logistics environment. The system can include at least one processor and at least one non-transitory, computer-readable medium containing instructions that, when executed by the at least one processor, cause the system to perform operations. The operations can include obtaining spatial information, resource information, and autonomous system information for a logistics environment. The operations can further include generating a spatial-temporal volume for the logistics environment using the spatial information. The operations can further include obtaining a resource request. The operations can further include generating a resource allocation volume based on the resource request and the resource information. The operations can further include generating a candidate updated spatial-temporal volume by allocating the resource allocation volume to a position in the spatial-temporal volume. The operations can further include determining the candidate updated spatial-temporal volume satisfies an autonomous systems condition using the autonomous system information. The operations can further include in response to the determination, updating the spatial-temporal volume based on the candidate updated spatial-temporal volume and providing instructions to one or more autonomous systems.

In some embodiments, generating the resource allocation volume can include determining a spatial extent and temporal extent of the resource allocation volume based on resource request characteristics. In some embodiments, the resource request can specify absolute or relative conditions on the placement of the resource allocation volume in the spatial-temporal volume, and the candidate updated spatial-temporal volume satisfies the specified absolute or relative conditions. In some embodiments, generating the candidate updated spatial-temporal volume can include allocating pooled resource allocation volumes according to allocation priorities of the pooled resource allocation volumes, and an allocation priority of the resource allocation volume depends on the resource request characteristics. In some embodiments, the instructions can correspond to a time slice and can be provided upon the beginning of time slice. In some embodiments, the provided instructions can include route information and task information for the autonomous system. In some embodiments, the provided instructions can include a path based on the task information and the route information. In some embodiments, the operations can further include receiving change information from a client system or detecting changes in the logistics environment, and providing, to the autonomous system, additional instructions to update a path of the autonomous system based on the change information. In some embodiments, the autonomous system information specifies one or more autonomous systems, tasks are associated with the resource allocation volume, task points are associated with the tasks, and determining the candidate updated spatial-temporal volume satisfies the autonomous systems condition includes: determining that each of the task points associated with each of the tasks can be reached by at least one of the one or more autonomous systems. In some embodiments, the task points include primary and secondary task points, and determining that each of the task points associated with each of the tasks can be reached by the at least one of the one or more autonomous systems includes determining that a secondary task point can be reached when a primary task point cannot be reached.

The disclosed embodiments further include non-transitory, computer-readable media containing instructions for implementing the above systems, and computer-implemented methods including the operations performed by the above systems.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIGS. 2A and 2B depict an exemplary characterization of a logistics environment in terms of spatial and time constraints, consistent with disclosed embodiments.

DETAILED DESCRIPTION

Figure 1:
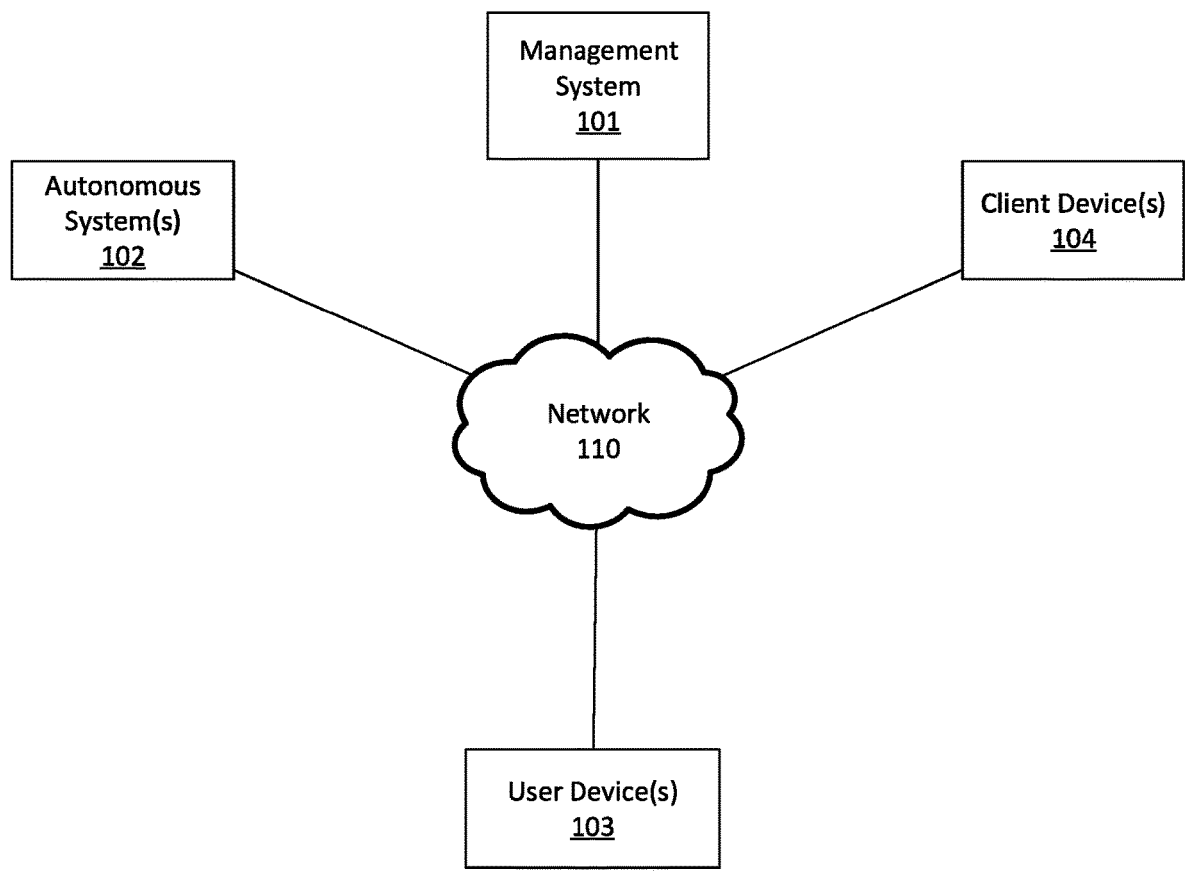
FIG. 1 depicts an exemplary system for managing a dynamic logistics environment, consistent with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings.

The ability to reconfigure logistics environments can improve the flexibility and efficiency of such environments. The disclosed embodiments use a spatially aware approach to configuring logistics environments that enables efficient allocation of resources within a logistics environment. As described herein, a resource request is converted into a volume within a spatial-temporal representation of the logistics environment. The volume can be packed with volumes representing other resource requests within the logistics environment. In some embodiments, constraints on the request can be expressed in terms of volume characteristics (e.g., the shape, spatial extent, temporal extent, or the like or the volume) or volume placement constraints (e.g., certain regions within the spatial-temporal representation of the logistics environment can be off-limits, certain regions can be preferred, certain requests cannot be placed together, etc.).

Unlike some conventional approaches, the disclosed approach can be performed sufficiently quickly to permit a complete reconfiguration of the space in response to each newly received resource request. Because a complete reconfiguration can be performed in response to each new resource request, more-difficult (e.g., more constrained, resource-intensive, immediate, or the like) but later-received requests are not blocked by less-difficult (e.g., less constrained, resource-intensive, immediate, or the like) but earlier-received requests. Accordingly, the logistics environment can satisfy more requests, improving the efficiency of the logistics environment and the use of the resources disposed therein.

A reconfiguration of the logistics environment consistent with disclosed embodiments can include an autonomous system task check, consistent with disclosed embodiments. A set of tasks can be specified for the logistics environment. In some embodiments, the tasks specified for a particular time can depend on the resource requests being satisfied at that time. A set of autonomous systems can be specified for performing the tasks. The autonomous system task check can determine whether the disclosed reconfiguration can support performance of the specified tasks using the specified autonomous systems. Satisfaction of the autonomous system task check can be a precondition for accepting the reconfiguration of the logistics environment.

The disclosed embodiments can include a planning component and an execution component. In the planning component, a management system can determine a configuration of the logistics environment in response to the receipt of requests or changes to the constraints on existing requests. In the execution component, the management system can provide instructions to the autonomous systems. The instructions can configure the autonomous systems to perform the specified tasks for the resources.

As described herein, a logistics environment can be or include a factory, port complex, warehouse, restaurant, distribution center, mining site, or the like. The particular resources disposed within the logistics environment can depend on the type of logistics environment. For example, machines, storage areas, loading areas, or the like can be resources when the logistics environment is a factory. As an additional example, cranes (e.g., ship to shore cranes, gantry cranes, or the like), loading and storage areas, and the like can be resources when the logistics environment is a port complex. As a further example, seating arrangements can be resources when the logistics environment is a service establishment, such as a restaurant, cafe, bar, hotel, gym, hairdresser, or the like. As an additional example, loading terminals, storage areas, or the like can be resources when the logistics environment is a warehouse or distribution center. As a further example, mining faces, drilling rigs, storage or dumping areas, loading terminals, or the like can be resources when the logistics environment is a mining site.

Consistent with disclosed embodiments, the types and characteristics of the autonomous systems disposed within a logistics environment can depend on the type of logistics environment. For example, autonomous systems disposed within a port complex can include autonomous terminal tractors, reachstackers, container handlers, mobile cranes, or the like. As an additional example, autonomous systems disposed within a service establishment can include autonomous waiters (e.g., servers and/or order takers), food runners, pickers, cleaning machines, and other mobile autonomous systems. As an additional example, autonomous systems disposed within a factory, warehouse, or distribution center can include autonomous material handlers, pallet movers, pickers, or the like. As a further example, autonomous systems disposed within mining site can include automated loaders, haulers, excavators, bulldozers, or the like. In each of these logistics environments, autonomous systems can include systems having security, customer service, or janitorial functions, such as challenging, greeting, or escorting visitors, workers, or guests at the logistics environment, or cleaning the logistics environment.

Consistent with disclosed embodiments, the tasks performed by autonomous systems disposed within a logistics environment can depend on the type of logistics environment. With regards to disclosed embodiments, a task can be described in terms of a pathway through the logistics environment. Unlike conventional systems that implement fixed or static pathways, the pathway can be dynamically changed depending on the dynamic reallocation of resources. Further, the pathway can be dynamically changed based on dynamically changing task points associated with resources. For example, an autonomous pallet mover in a distribution center can be tasked with moving between a loading dock and storage locations in the distribution center. The autonomous pallet mover can dynamically switch to a new route when a previously used route become obstructed. A task point can be associated with the loading dock and another task point can be associated with each dynamically changing storage location. The autonomous pallet mover can therefore be associated with a dynamically changing unobstructed pathway that connects the loading dock and each dynamically changing storage location. As an additional example, an autonomous server/order taker system in a service establishment can be tasked with obtaining customer orders from tables and returning the ordered items from the kitchen to the tables. The pathway used to move between the tables and kitchen can dynamically change when the tables (or other tables) are repositioned. The kitchen can be associated with a task point (e.g., a kitchen entrance or loading station). Each table (e.g., each resource) can be associated with one or more task points (e.g., a single order-taking or delivery location per table, an order-taking or delivery location per seat, or the like). The autonomous server/order taker system can therefore be associated with a dynamically changing unobstructed pathway that connects the kitchen and each table (or seat, or the like). An autonomous security system can have a dynamic pathway that provides a view of all sides of all resources (or of a subset of resources) within the logistics environment. In some embodiments, additional task points can include autonomous system idle locations, recharging locations, or servicing and repair locations. In some embodiments, pathways can be determined to ensure the reachability of such additional task points.

As may be appreciated, autonomous systems can be instructed with pathways that can overlap. In execution, autonomous systems can be prioritized by task. Such prioritization can enable multiple autonomous systems to use the same space without blocking each other. In some embodiments, prioritization can be implemented in a distributed fashion, with autonomous systems communicating tasks with other autonomous systems to ensure that autonomous systems having higher priority tasks have the "right of way" or alternatively taking one dynamically changing pathway to deliver something and a dynamically different pathway to return. In some embodiments, prioritization can be implemented in a centralized fashion, with a management system coordinating the movement of autonomous systems to prevent multiple autonomous systems from attempting to simultaneously use the same space, when that space cannot accommodate multiple autonomous systems. In some embodiments, distributed prioritization can be combined with centralized prioritization, with the management system being able to override local coordination between autonomous systems.

In some embodiments, autonomous systems can possess limited local routing ability. For example, an autonomous system can be able to route around obstructions (or wait for such obstructions to be cleared, or provide an auditory or electronic signal requesting clearing of such obstructions). In some embodiments, the autonomous system can route around obstructions based on a current map of the logistics environment and input data obtained from local sensors on the autonomous system (e.g., camera sensors, LIDAR sensors, ultrasound sensors, touch sensors, or the like). In some embodiments, the autonomous system can additionally or alternatively use input data obtained by sensors disposed in the logistics environment (e.g., security cameras, wireless or RFID beacons, traffic sensors, or the like). Such additional input data may be relayed directly to the autonomous system, or collected and used to generate instructions by the management system, which can then route the instructions to one or more autonomous systems.

For convenience, the disclosed embodiments are illustrated with examples of service establishments, such as restaurants. Service establishments provide convenient examples for illustrating the operation of constraints on resource requests, resource use, and automated system types. However, as may be appreciated from the foregoing discussion, the disclosed embodiments are not so limited.

FIG. 1 depicts an exemplary system 100 for dynamically reconfiguring logistics environments, consistent with disclosed embodiments. In some embodiments, system 100 can include network 110, management system 101, autonomous systems 102, user devices 103, and client devices 104. Consistent with disclosed embodiments, components of system 100 can interact to enable the use of autonomous systems in a changing logistics environment.

Network 110 can be configured to enable communication among components of system 100 (e.g., management system 101, autonomous system 102, and user devices 103). Network 110 can be or include a wireless communication network (e.g., a cellular network, a WIFI network, a ZIGBEE network, a BLUETOOTH network, or the like), a wired communication network (e.g., a POTS telephone network, an optical network, or the like), or a combination of wired and wireless networks. The disclosed embodiments are not limited to any particular physical or logical implementation of network 110, or any particular communication protocol (or communication protocol(s)) for network 110.

Management system 101 can be a computing system, such as a laptop, desktop, workstation, server, computing cluster, or cloud computing system. Management system 101 can be co-located with the logistics environment, or can be remote from the logistics environment. In some embodiments, management system 101 can be configured to provide management services for multiple different logistics environments.

Management system 101 can be configured to implement a planning component of the the disclosed embodiments. In the planning component, management system 101 can obtain resource requests. The resource requests can be obtained from the user devices 103, or from another system (not shown). For convenience of description, the planning component is described herein with respect to a service establishment, for which the resource requests can be reservations. However, the disclosed embodiments are not so limited. In some embodiments, the reservations can be obtained using an automated system (e.g., an online reservation portal) or manually entered into management system 101 (e.g., as part of an in-person or telephonic reservation process). As described herein, management system 101 can be configured to convert the reservations into volumes in a spatial-temporal volume representing the logistics environment. As each reservation is received, management system 101 can be configured to release all reservations satisfying an availability condition (e.g., not currently or soon to be in use, or the like) and reallocate the reservations.

Consistent with disclosed embodiments, management system 101 can be configured to reallocate all reservations. In some embodiments, the reallocation order can depend on a priority measure. In some embodiments, the priority measure can depend on a difficulty of the reservation. The difficulty of the reservation can depend, at least in part, on a size of the party and a duration (or estimated duration) of the reservation. The difficulty can depend on constraints associated with the reservation. In some embodiments, the priority measure can depend on characteristics of the reservation or characteristics of the person making the reservation (e.g., historical data concerning the person, a status of the person, a menu, a product, items, or other resources selected by the person at the reservation time). In some embodiments, reservations can be clustered around each other or distributed within the volume, while maintaining space for the performance of tasks (e.g., tasks associated with the reservation, other reservations, or the overall logistics environment).

Consistent with disclosed embodiments, management system 101 can be configured to determine tasks associated with the allocated reservations. Such tasks can include obtaining orders, delivering food, greeting reservation holders and leading them to their tables (e.g., using the dynamically changing pathways). In some embodiments, tasks can be determined by a mapping from allocated reservations to tasks. For example, each reservation may require a greeting task, an ordering task, an item delivery task, and a cleanup task. These tasks may be associated with times. As may be appreciated, this enumeration of tasks is not intended to be limiting. An overall set of tasks can be determined based on the overall set of resources.

Consistent with disclosed embodiments, management system 101 can be configured to determine autonomous systems associated with the tasks. In some embodiments, the autonomous systems can be determined by a mapping from tasks to autonomous systems. For example, an ordering/delivery system can be configured to service ordering and item delivery tasks. Based on the characteristics of the ordering/delivery system, management system 101 can attempt to determine pathways around the allocated volumes and connecting the task points for each task. In some embodiments, when management system 101 cannot determine a pathway for a task (e.g., a table or a chair at a table cannot be reached by a delivery system) management system 101 can reject the allocation and attempt a new allocation. The new allocation can use a different relocation order, or can place one or more reservations in a different location, as compared to the prior location.

Consistent with disclosed embodiments, management system 101 can be configured to provide instructions to autonomous systems 102. In some embodiments, the instructions can be provided upon completion of the planning component (e.g., allocation of all pending reservations). In some embodiments, the instructions can specify the updated arrangement of the spatial-temporal volume, showing the allocated volumes, task points, and pathways for autonomous systems. As an additional example, the instructions can specify the updated arrangement for a time slice of the spatial-temporal volume. The time slice can correspond to a particular spatial arrangement of resources within the logistics environment. For example, the time slice can begin when the resources are assigned a particular spatial arrangement and can end when the spatial arrangement of resources is changed. Accordingly, a time slice can define a time period. As may be appreciated, the duration of a time slice may not be fixed, as subsequently received resource requests can change the spatial arrangement of resources, even after a time slice has begun.

The instructions can specify the allocated volumes, task points, and pathways for autonomous systems for that particular spatial arrangement.

Consistent with disclosed embodiments, management system 101 can be configured to implement an execution component of the disclosed embodiments. In some embodiments, in the execution component, management system 101 can be configured to provide information concerning the status of the logistics environment to the autonomous systems 102. Such information can include the presence of obstacles in pathways used by an autonomous system and rerouting information for the autonomous system (e.g., a new pathway for use by the autonomous system).

Consistent with disclosed embodiments, management system 101 can be configured to provide views into the spatial-temporal volume to a client device (e.g., one of client devices 104). For example, the client device can be configured to request a view of a time slice of the spatial-temporal volume. The view can depict the allocated volumes, task points, and pathways for autonomous systems for that particular spatial arrangement. Allocated volumes can be selectable, such that in response to a user selection of a view, management system 101 can provide information concerning the reservation corresponding to the allocated volume. In some embodiments, a user can interact with the view to drag and drop an allocated volume to a new location. Such an interaction can trigger the management system 101 to reallocate any conflicting allocations (and, in some embodiments, create new routes as necessary), while maintaining the position of the manually moved reservation. In some embodiments, if the manually moved reservation cannot be accommodated without cancelling other reservations, the manually moved reservation can slide back to its original location. Alternatively, a popup can offer the user the option to cancel the conflicting reservation(s). The conflicting reservation(s) can be indicated in the view (e.g., using a visual effect, such as blinking, color changes, transparency changes, outlining, or another suitable visual effect).

Autonomous systems 102 can be autonomous systems, as described herein. Autonomous system 102 can be configured to obtain instructions from management system 101. In some embodiments, the instructions can include an updated spatial-temporal volume, or a time-slice of such a volume, for use in path planning by the autonomous system. In some embodiments, ones of autonomous system 102 can be configured for distributed control. In such embodiments, the autonomous systems can communicate to exchange position information and avoid blocking, interfering or slowing down each other's routes. In some embodiments, ones of autonomous system 102 can be configured to communicate with management system 101 to exchange position information and avoid blocking, interfering or slowing down each other's routes.

User devices 103 can be configured to provide resource requests to management system 101, consistent with disclosed embodiments. User devices 103 can be wearable devices, phones, smartphones, tablets, laptops, desktops, or the like. User devices 103 are not limited to any particular method of providing requests to management system 101. In some embodiments, user devices 103 can interact with a portal or reservation system hosted by management system 101. In some embodiments, the portal or reservation system can be separate from management system 101: the user devices can indirectly provide the reservations to management system 101 through the portal or reservation system. In some embodiments, a user can interact with a user device can contact a person (e.g., a person affiliated with the logistics environment, such as a customer service representative, or the like) who can input a reservation to management system 101.

Client devices 104 can be configured to enable configuration and review of the operations of management system 101. Client devices 104 can be wearable devices, smartphones, tablets, laptops, desktops, workstations, computing clusters, cloud computing platforms, or the like.

In some embodiments, client devices 104 can be configured to enable changes to the representation of the logistics environment. For example, a user can interact with a client device to specify the dimensions of the logistics environment, specify relevant locations (e.g., kitchen entrance, restaurant entrance, charging locations, or the like), specify subsets of the logistics environment subject to particular constraints (e.g., a bar area having a limited menu, a VIP section available only to VIP reservations, a non-smoking section, or the like), describe resources or potential resources (e.g., available seating arrangements or furniture useable to create or modify seating arrangements), describe a utility of the space (e.g., view, private area, quiet area, or the like), specify temporal constraints (e.g., opening hours, seating periods, maximum reservation durations, or the like), specify available automation systems and the characteristics thereof (e.g., the width, speed, task type, interactive capabilities, or the like) or specify other characteristics of the logistics environment.

In some embodiments, client device 104 can be configured to enable a display of the current spatial temporal volume for the logistics environment. In response to a request from a client device, management system 101 can be configured to provide the spatial-temporal volume, or a slice thereof, to the client device. The client device can display a time slice of the spatial-temporal volume in a graphical user interface. The graphical user interface can be configured with a control (e.g., a slider, knob, or the like) that enables a user of the client device to select a time slice for display. In some embodiments, the user can interact with the graphical user interface to lock an allocation of a resource (e.g., so that it will not be moved in response to receipt of subsequent reservations) or move an allocation of a resource (e.g., potentially triggering the reallocation of other resources).

FIGS. 2A and 2B depict an exemplary characterization of a logistics environment in terms of spatial and time constraints, consistent with disclosed embodiments. As depicted in FIG. 2A, spatial-temporal volume 200 can include multiple spatial dimensions and a temporal dimension. In this example, the floorplan of the logistics environment can be laid out in two spatial dimensions and extended through the temporal dimension. Consistent with disclosed embodiments, the floorplan can be at least approximately to scale. For example, the floorplan can represent the moveable and/or planned or as-built dimensions of the logistics environment (or of a portion for the logistics environment that the disclosed systems and methods are intended to manage). In this simplified example, the floorplan of the logistics environment is a rectangle. However, in practice, the floor plan will likely have an irregular envelope and can include inaccessible interior areas (e.g., interior columns, walls, freestanding decorations, bars, and the like). Furthermore, the floorplan can include areas, subareas and sections, the division of the areas and/or subareas and/or sections which can be further divided into classes, and seating arrangements. The seating arrangements can be represented by dimensionally accurate spatial extents. As may be appreciated, in some instances the logistics environment can include three spatial dimensions. For example, a warehouse with multilevel storage racks may be described in terms of three spatial dimensions, as different levels of the storage racks can be configured to store different items.

Consistent with disclosed embodiments, a management system can allocate volumes (e.g., allocated volume 201A, 201B, and 201C) within spatial-temporal volume 200 to satisfy resource requests. The volume allocated can depend on the characteristics of the request. In the exemplary restaurant reservation context, the spatial extent of the allocated volume can depend on party size. In some embodiments, party size can determine the equipment used to satisfy the request (e.g., the table(s), chair(s), booth(s), or the like). An advantage of this approach over conventional approaches (e.g., seating charts or fixed table layouts) is that equipment can be added, removed, or rearranged as needed to satisfy resource requests. The equipment can then determine the spatial extent of the allocated volume (e.g., a high-top may require less space than a dining table and chairs). The temporal extent of the allocated volume can be given expressly in the request, or can be estimated (e.g., based on prior behavior of this customer or customers generally, menu selections by the customer, or the like).

Consistent with disclosed embodiments, time slice 202 can depict the spatial arrangement of the logistics environment at a particular time. FIG. 2B depicts a view of time slice 202 showing the spatial extent of allocated volumes 201B and 201C at that time (volume 201A does not extend into time slice 202 and therefor is not depicted in that time slice).

Figure 3:
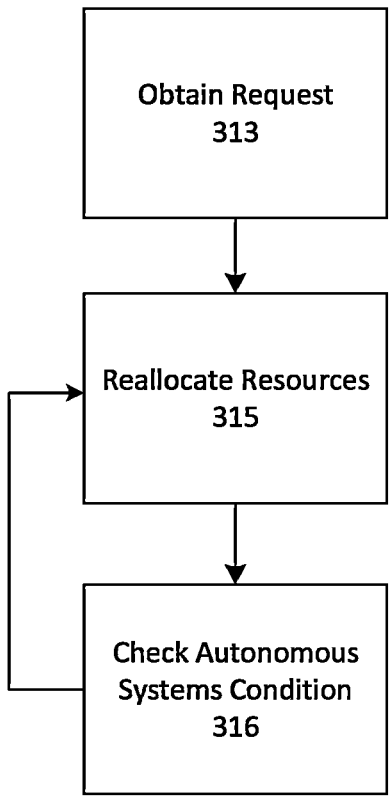
FIG. 3 depicts a process of updating a logistics environment plan for use with autonomous logistics systems, consistent with disclosed embodiments.
Figure 3:
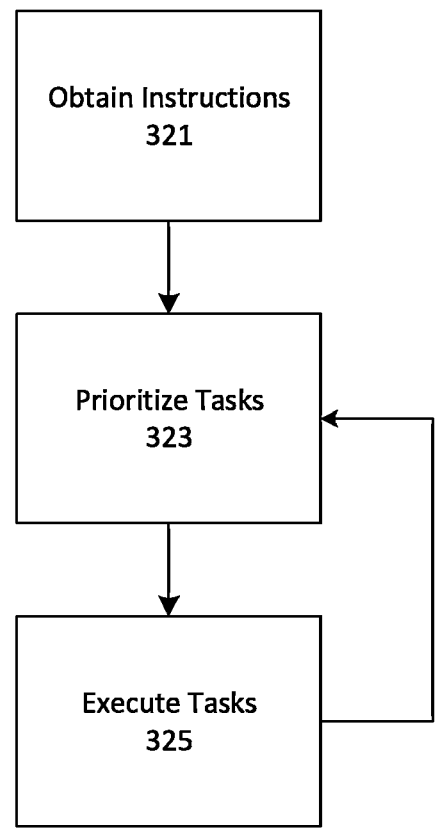

FIG. 3 depicts a planning method 310 and an execution method 320, consistent with disclosed embodiments. In some embodiments, a management system (e.g., management system 101, or the like) can be configured to perform planning method 310. Autonomous systems (e.g., autonomous system 102, or the like) can be configured to perform execution method 320. Performance of planning method 310 can generate or update a spatial-temporal volume, which can inform the performance of execution method 320 (e.g., as indicted by the arrow from planning method 310 to execution method 320).

Planning method 310 can include steps of receiving a resource request, reallocating existing requests, and checking that the reallocated requests satisfy an autonomous systems condition. Planning method 310 can accept inputs including a configuration of the logistics environment and can produce a spatial-temporal volume including an arrangement of resource allocations (e.g., as depicted in FIGS. 2A and 2B).

In some embodiments, the configuration of the logistics environment can include a floorplan of the logistics environment. The floorplan can be to scale and can depicts features within the logistics environment that affect the ability to reposition resources within the logistics environment. For example, structural features within the environment can be depicted, such as columns, interior walls, stairways, ramps, and the like. Similarly, features that affect placement of resources within the logistics environment can be depicts, such as window, doors, entrances and exits, and the like. As may be appreciated, some resources may have fixed locations within the logistics environment (e.g., immobile storage racks, cranes, machinery, booths, bars, etc.) and may therefore be represented within the logistics environment.

In some embodiments, the configuration of the logistics environment can further include a description of resources available for use within the logistics environment. The description of resources can indicate the number of resources available for use. Furthermore, the description can map from the resource to a spatial extent required to deploy the resource within the environment. As may be appreciated, while some resources may have compact spatial extents when deployed (e.g., circles, rectangles, or the like), other resources can have irregular spatial extents when deployed. In some embodiments, the spatial extent associated with the resource may include not just the physical extent of the resource, but also the space around the resource required to use it (e.g., loading space near a machine for inputs, traverse space for a crane, space to move chairs away from a table, etc.).

In some embodiments, the description can specify task points for the resource (e.g., a materials input, production output, seats, storage bin entrance, or the like). In some embodiments, the spatial extent associated with the resource may include space for autonomous systems to reach the task points.

In some embodiments, the description of resources can be parameterized, such that characteristics of a request for the resource can affect the required spatial extent in predetermine ways. Using a seating arrangement at a service establishment as a convenient example, a rectangular table may accommodate one to four chairs. But when the rectangle table is only accommodating one chair, the spatial extent required for the table (and chair) can be much smaller than when the rectangular table is accommodating two, three, or four chairs.

In some embodiments, the configuration of the logistics environment can further include a description of the autonomous systems that can be deployed within the logistics environment. The description can specify the number, types, suitable tasks, communication protocols, or other relevant characteristics of the autonomous systems. In particular, the description can specify the spatial extent of the autonomous systems.

In step 313 of planning method 310, the management system can be configured to obtain a request. In some embodiments, the management system can obtain the request from a user device (e.g., one of user devices 103, or the like), such as through an online reservation portal, or a client device (e.g., one of client devices 104, or the like) such as in response to a manually provided request (e.g., a telephone call, in-person request, or the like). In some embodiments, the management system can be configured to maintain a waitlist of requests that cannot presently be accommodated. In such embodiments, obtaining the request can include pulling the request from the waitlist. The waitlist may include requests ordered by some measure of allocation difficulty. The request may be pulled from the list based on the measure of allocation difficulty (e.g., most difficult request, least difficult request, or the like).

In some embodiments, the request can include request characteristics. Request characteristics can depend on the type of logistics environment. In some embodiments, request characteristics can affect the extent of the allocated volume (e.g., either by affecting the spatial extent of the resource used, or the duration of use of the resource), affect the absolute placement or relative placement of allocated volumes within the spatial-temporal volume, or affect the allocation priority of the request. For example, in terms of the temporal dimension of the spatial-temporal volume, an absolute condition may be a start time or finish time, while a relative condition might require that a request have a start time suitably staggered from the start times of other requests. As an additional example, in terms of the spatial dimension of the spatial-temporal volume, an absolute condition might require that a request be allocated to a particular space or sub-space within the spatial-temporal volume, while a relative condition may require a certain minimum distance between the allocated resource and other allocated resources (or conversely specify the allocated resource can be clustered with other such resources). As another example, a status of the requestor can increase the allocation priority of the request. For example, a VIP requestor may need to be accommodated prior to other non-VIP requestors. In some embodiments, a request characteristic can affect multiple ones of the extent of the allocated volume, the placement of the allocated volume, or the allocation priority of the request. For example, a VIP requestor can be associated with a particular space or sub-space of the logistics environment (e.g., an absolute placement condition), a particular table type (e.g., an extent condition) and may be placed prior to the placement of other non-VIP requestors (e.g., an allocation priority condition).

In some embodiments, the allocation priority condition can depend on the difficultly of the request. The difficulty of the request can depend on the request characteristics (e.g., spatial extent, allocation conditions, or the like). In some embodiments, the difficulty of the request can depend on the logistics environment. As may be appreciated, the mapping from request characteristics to difficulty can vary between logistics environments (even logistics environments of the same type). For example, allocation difficulty may increase slowly with party size for a cafeteria-style restaurant where patrons sit at long, common benches, while allocation difficulty may increase rapidly with party size for a bistro with a limited number of large tables.

As a convenient example, when the logistics environment is a service establishment, the request can specify a reservation start time and a party size. In some embodiments, the management system can determine a spatial extent of the resource request based on the party size. For example, the management system can determine, based on the specified resources (e.g., the available tables, booths, etc.), an available seating arrangement having the minimum spatial extent that seats the party size. As may be appreciated, the available seating arrangement need not be disposed within the logistics environment at the time of the determination. For example, the specified resources for the service establishment can include tables in storage, which can be brought out of storage and arranged as required. Similarly, existing tables may be combined or divided to realize the seating arrangement for the request. In some embodiments, the management system can determine multiple potential candidates for the resource allocation. A first candidate can use available seating already deployed in the logistics environment. A second candidate can use a combination of available seating already deployed in the logistics environment. A third candidate can use seating deployable to the logistics environment.

To continue this example, the request may include order information for the party. Based on the order information (and/or on historical data), the management system can determine an estimated duration for the reservation. This estimated duration can determine the temporal extent of the reservation (and in some embodiments, affect the difficulty of allocating the reservation). Alternatively, the request may specify the duration or end time of the reservation. The request may include placement constraints (e.g., non-smoking, bar area, away from other tables, by a window, etc.). In some embodiments, the logistics environment can include subspaces, and the request can specify a subspace, or particular utility or attribute within the space (which may, in some embodiments, affect the difficulty of allocating the reservation).

The management system can determine a spatial-temporal extent for the request. To continue the prior example, the management system can determine that the minimum available seating arrangement is a table with four chairs. The spatial extent can be determined by the description of the table, parameterized to include four chairs (e.g., room for the chairs and room for the patrons to pull the chairs back and seat themselves without hitting neighboring chairs or table).

The management system may assign an allocation difficulty to the request based on the spatial-temporal extent of the request. Such a mapping may balance large, short-duration requests against smaller, long-duration requests. In this non-limiting example, the total volume in square ft*minutes (or a function thereof) can be the allocation difficulty. In this example, the allocation priority can be the allocation difficulty, such that the most difficult resource requests are allocated first.

In some embodiments, the allocation priority can depend on additional factors or conditions. For example, the management system can maintain a VIP and a non-VIP list of resource requests, such that the least difficult VIP request is addressed before the most difficult non-VIP request. As an additional example, the starting time of the request can affect the allocation priority. For example, the allocation priority can be increased when the starting time of the request falls within a high-priority time-period (e.g., lunch rush or dinner rush). Increasing the priority of such requests can increase the likelihood that those requests are satisfied.

In some embodiments, the management system can determine tasks associated with the request. In general, the tasks can concern those components of servicing the resource request that are intended to be performed by the autonomous systems deployed within the logistics environment. The tasks, and the association of tasks with requests, can depend on the type of logistics environment. A mapping from resource requests to tasks can depend on the particular logistics environment. As a convenient example, one service establishment may choose to automate the host/reception function otherwise performed by a receptionist or greeter, while another service establishment may choose to use a human host/receptionist.

As a non-limiting example, when the logistics environment is a service establishment and the resource requests are reservations, the mapping from resource requests to tasks can include default tasks and request-specific tasks. In some embodiments, default tasks can include an instance of delivering ordered items to a seating arrangement associated with the request. In some embodiments, default tasks can include an instance of obtaining orders from the party associated with the request (e.g., by visiting the table). In some embodiments, default tasks can include returning to the table to transport dishes away from the table. In some embodiments, request-specific tasks can include tasks that depend on items selected by the requestor. For example, when the request selects multiple courses, the tasks associated with the request can include multiple iterations of obtaining orders, delivering items, and transporting dishes. As an additional example, when the request includes instructions that the guests be greeted at the entrance and guided to their seats, the tasks can include repeatedly performing such guiding until all of the guests are seated.

As described herein, a task associated with a request may include one or more task points. The task points associated with a task can depend on the type of task. For example, when the task is delivering food to a table, the task points can be the kitchen location (or some location where the autonomous system can be loaded with items) and the seats of the party at the table. In some embodiments, secondary task points can be defined for when primary task points cannot be reached. For example, a single location sufficiently close to a table may serve as a secondary task point when the primary task points cannot be reached.

In some embodiments, a task can be associated with a relative time or time window. For example, an ordering task can be scheduled for a time between 0 and 15 min after the start of the request. As an additional example, an item delivery task be scheduled for a time between 30 and 45 min after the start of the request. In some embodiments, the task timing can depend on the characteristics of the request. For example, a request can include item selections off a menu. Based on the item selections, the item delivery task can be delayed (e.g., if an item takes a longer-than-typical time to prepare) or accelerated (e.g., if all the request items take shorter-than-typical times to prepare).

In step 315 of planning method 310, the management system can reallocate resources in response to the received request. The reallocation process can include the following steps.

In a first step, the management system can identify all resource allocations that are not currently in use. In some embodiments, the management system can further identify those used resource allocations that are not locked in place. The management system can pool all the unused (in some embodiments, all the unused and unlocked) resource allocations. The management system can sort the pooled resource allocations according to allocation priority.

In an optional second step, the management system can attempt to place the highest-priority allocation into an available fixed resource in the spatial-temporal volume. As described herein, the spatial-temporal volume may include fixed resources (e.g., booths that cannot be moved, immobile machinery, or the like). The management system can place the highest-priority allocation into the available fixed resource when the spatial extent of the resource matches the spatial extent of the resource allocation, or when the party size of the request matches the maximum party size for the resource. Should the management system successfully place the highest-priority allocation, then the management system can restart step 2 with the second-highest priority allocation, etc. Otherwise, the management system can proceed to step 3.

In an optional third step, the management system can attempt to place the highest-priority allocation into an available fixed resource in the spatial-temporal volume. As described herein, the spatial-temporal volume may include fixed resources (e.g., booths that cannot be moved, immobile machinery, or the like). The management system can place the highest-priority allocation into the available fixed resource when the party size for the request is greater than a minimum party size for the resource (and less than a maximum party size for the resource). Should the management system successfully place the highest-priority allocation, then the management system can restart step 2 with the second-highest priority allocation, etc. Otherwise, the management system can proceed to step 4.

As may be appreciated, some logistics environments may lack fixed resources and steps 2 and 3 may be omitted.

In the fourth step, the management system can place the highest priority allocation into an available volume in the spatial-temporal volume. As described, multiple candidates can be considered for the allocation. The management system can consider the different candidates (e.g., the first, second, and third candidates described above) to determine whether one of the candidates can be used. In some embodiments, if the request cannot be allocated, then the management system can relax a constraint in the resource request and reattempt placement of the resource allocation. For example, the allocation request may specify an absolute or relative spatial placement. The management system can remove this constraint and reattempt positioning of the request allocation within the spatial-temporal volume. As an additional example, the management system can attempt different start times or different durations. Should the management system successfully place the highest-priority allocation, then the management system can restart step 2 with the second-highest priority allocation, etc. In some embodiments, if the management system cannot allocate a request, the request can be shifted to a waitlist.

As may be appreciated, these steps can be performed until all of the pooled resource requests have been either reassociated with a volume in the spatial-temporal volume or shifted to the waitlist.

In step 316 of planning process 310, the management system can check an autonomous systems condition. In some embodiments, the autonomous systems condition can be satisfied when each task associated with each resource request can be performed, given the allocation of resource requests to the spatial-temporal volume determined in step 316.

In some embodiments, the management system can be configured to assign tasks for the allocated resources to autonomous systems deployed in the logistics systems. The management system can assign the tasks based on the anticipated timing of the tasks and the capabilities of the autonomous systems. For example, a single autonomous unit capable of taking orders and communicating them to the management system (or another system of the logistics environment) can circumvent the logistics environment in one pass, taking orders, then serially deliver orders in subsequent passes. The ability of the autonomous unit to take orders and deliver them can depend on the number of resource requests, the speed of the autonomous system, the size of the logistics environment and the spatial layout of the allocated requests.

In some embodiments, the management system can determine whether the assigned autonomous systems can perform the assigned tasks. For example, the management system can determine whether the autonomous systems can reach the task points associated with each assigned task (or the secondary task points, if the autonomous systems cannot reach the primary task points). In some embodiments, a primary or secondary task point can be reached when, for all time slices containing a task point, an assigned autonomous system can reach a point within a threshold distance of the task point. If the autonomous systems cannot reach the task points, then method 310 can return to step 315 and a new allocation of resources can be determined.

In some embodiments, additional task points can be associated with the logistics environment, as opposed to particular tasks. For example, task points can be associated with charging or idling locations disposed within the logistics environment. The autonomous systems can be configured to return to such locations when charging or otherwise not in use. In such embodiments, when determining routes for the autonomous systems, the management system can be configured to determine whether the idling and charging points are reachable by those autonomous systems that may need to use them.

In some embodiments, the management system can determine a route map for the logistic environment, given the allocation determined in step 315. In some embodiments, a route can be specific to a particular autonomous system, or to multiple autonomous systems. In some embodiments, a route can be specific to a task (e.g., item delivery) or can be specific to multiple tasks. In some embodiments, the management system can determine multiple routes for different tasks or autonomous systems, and then combine these multiple routes into a single route map for the logistics environment. In some embodiments, the management system can allocate volume in the spatial-temporal volume for the logistics environment for the routes. Thus, the routes can be displayed (or displayable) on a time slice of the spatial-temporal volume.

As may be appreciated, the management system can determine multiple candidate routings for a given set of tasks and autonomous systems. The management system can rank the multiple candidate routings based on performance criteria. In some embodiments, the performance criteria can depend on the number of autonomous systems required to perform the tasks. The fewer autonomous systems required, the higher the performance criteria. In some embodiments, the performance criteria can depend on the area of the logistics environment used by the routes, with lower area corresponding to higher performance (e.g., a more efficient use of the space in the logistics environment), or the resilience or redundancy of the route map (e.g., the presence of alternative paths between task points, etc.), or some combination of the foregoing.

In some embodiments, the management system can be configured to identify high-traffic locations based on the resource allocation volumes. The high-traffic locations can be locations predicted to have a relatively large people walking through them. For example, the management system can determine paths connecting each table to points of interest like the kitchen, the entrance to the service establishment, the bathrooms, or the like. Locations where a sufficient number of paths overlap can be deemed high-traffic locations. As such locations can expect substantial traffic, routing autonomous systems through such locations may be less disruptive. Accordingly, the management system can be configured to routing the autonomous systems through the high traffic locations. As may be appreciated, routing the autonomous systems through the high-traffic locations can include assigning lower weights to paths through those regions, or other path-finding strategies for favoring routes through those high-traffic locations. As may also be appreciated, different locations can be deemed to be high-traffic locations at different times (e.g., the greeting customers at the beginning of a service versus the delivery of food after people have ordered and the food has been cooked).

In some embodiments, if the management system cannot determine a route map that satisfies a performance condition, then method 310 can return to step 315 and a new allocation of resources can be determined. Otherwise, the management system can accept the updated spatial-temporal volume for the logistics environment. The updated spatial-temporal volume can determine the allocation of resources in the logistics environment in response to resource requests, and the allocation of routes for use by autonomous systems in servicing those resource requests.

In some embodiments, path planning efficiency can be improved by calculating and monitoring distance travelled, time taken, or other suitable criteria by each autonomous system (and optionally by all autonomous system). Likewise, different paths of travel for similar services can be compared. This information can be used to train a path planning system to improve an outcome (e.g., reduce the distance travelled, reduce the time taken, or the like). In some embodiments, a path planning metric can be generated by calculating the travel and work times expended between different autonomous systems. The management system can be configured to balance travel and work times while minimizing the overall distances travelled. In some embodiments, a path planning metric can be generated by positioning the autonomous systems so that they are not in the way and distances are reduced between potential calls from customers, food production area or other automated calls from other ancillary systems.

Execution method 320 can include steps of receiving instructions from the management system, prioritizing tasks, and executing tasks. As described herein, execution method 320 can be performed by autonomous systems disposed within a logistics environment. Execution method 320 can also include providing instructions to workers associated with the logistics environment. The instructions provided to the workers can instruct the workers to configure the resources for use with the autonomous systems to satisfy the resource requests. For example, the instructions can be provided to workers in a restaurant to configure the seating arrangements to match the spatial arrangement specified in a spatial-temporal volume for the restaurant. In some embodiments, such instructions can be provided to the workers using one or more client devices (e.g., one or more of client devices 104). As may be appreciated, the graphical user interfaces disclosed herein can enable the workers to visualize the correct spatial arrangement.

In step 321 of method 320, an autonomous system can obtain instructions from a management system. In some embodiments, the autonomous system can receive the instructions from the management system. For example, the management system can push the instructions to the autonomous system over a network (e.g., network 110, or the like).

In some embodiments, the management system may only provide the instructions for the next time-slice upon the beginning of that time slice. For example, based on current reservations, the management system can determine routes for a logistics environment from 4:37 PM to 5:15 PM. The management system may then provide instructions to the autonomous system at 4:37 PM. At 4:35 pm, in response to a reservation request for 5:00 pm, the management system can determine updated routes beginning at 5:00 pm (as the unlocked and used allocation requests can be pooled and re-allocated, as described herein). But the management system may not provide updated routes to the autonomous system until 5:00 PM.

In some embodiments, the management system may provide instructions for the next time slice in advance of the beginning of the next time slice. The autonomous system can be configured to buffer these instructions until the beginning of the next time slice. Should the management system update the spatial-temporal volume prior to the beginning of the next time slice, the management system can provide updated instructions. The autonomous system can then overwrite or discard the prior instructions and store the updated instructions. For example, based on current reservations, at 4:15 PM the management system can determine routes for a logistics environment from 4:37 PM to 5:15 PM. At 4:15 PM, the management system can provide instructions for the time-slice from 4:37 PM to 5:15 PM. At 4:20 PM, in response to a reservation request for 5:00 PM, the management system can determine updated routes beginning at 4:30 PM. The management system can then provide updated instruction to the autonomous system. The autonomous system can disregard, discard, or overwrite the prior instructions for the time-slice from 4:37 PM to 5:15 PM, and store the instructions for the new time slice. At 4:30 PM, the autonomous system can begin performing tasks using the routes in the new time slice.

In some embodiments, the autonomous system can pull the instructions from the management system. For example, the autonomous system can poll the management system for instructions over the network. The autonomous system may poll the management system at an interval dependent on the logistics environment. For example, when the logistics environment is a restaurant, the autonomous system may poll the management system at intervals between 1 and 30 minutes.

Consistent with disclosed embodiments, the instructions can include route information for a time-slice. In some embodiments, the route information can be specific to the autonomous system that receives the instructions. In some embodiments, the same route information can be provided to all of the autonomous systems. The disclosed embodiments are not limited to any particular representation of the route information. In some embodiments, the route information can be provided as spaces, subspaces or sections on a floor plan (e.g., as depicted in a time slice). In some embodiments, the route information can be provided as a graph (or a data structure equivalent to a graph), with nodes corresponding to locations (e.g., task points, branching points where routes split, etc.) and routes corresponding to edges between locations.

Consistent with disclosed embodiments, the instructions can include task information for a time-slice. As described herein, tasks can be associated with resource allocations. Multiple tasks can arise from the same resource allocation. These tasks may be distributed among multiple autonomous systems (e.g., a greeter system, an ordering system, an item delivery system, a dirty dish removal system, or the like). In some embodiments, the tasks can be associated with times or time ranges (e.g., go to seat 1 of table 5 at 5:00 pm and request order information, then go to seat 2 of table 5 and request order information; go to seat 1 of table 6 between 5:00 pm and 5:10 pm and request order information, then go to seat 2 of table 5 and request order information; etc.).

In step 323 of method 320, the autonomous system can prioritize the tasks. In some embodiments, prioritizing the tasks can include determining a path along the routes that connects the task points of all of the tasks assigned to the autonomous system. The path can be created or selected to minimize any deviation between the scheduled time that the autonomous system reaches an assigned task point and the predicted time that the autonomous system reaches the assigned task point. In some embodiments, certain tasks can be higher-priority than other tasks. In such embodiments, the autonomous system can be configured to weight time deviations from scheduled times heavier for higher-priority tasks than time deviations from scheduled times for lower-priority tasks.

In some embodiments, the determination of a path for an autonomous system can be performed by the management system (e.g., based on the route information and task information for the autonomous system). In some such embodiments, the management system can determine the paths for the autonomous systems collectively. As may be appreciated, routes can be limited in width and autonomous systems may block each other's usage of routes. By determining paths collectively, the management system can prioritize the movements of autonomous systems that performs higher-priority tasks (e.g., item delivery) over the movements of autonomous systems that perform lower-priority tasks (e.g., dish removal). In such embodiments, the instructions can include the path information.

In step 325 of method 320, the autonomous system can execute the tasks. As may be appreciated, the status of the logistics environment can change during performance of the tasks. To use a service establishment as a convenient example, patrons may leave without completing their reservation, items may be ready for delivery earlier or later than scheduled, routes may be obstructed by patrons, or in other ways the scheduled path may no longer be appropriate.

A user interfacing with a client device can provide information to the management system regarding changes in reservations or tasks. In some embodiments, the management system can contact the autonomous systems over the network to provided updated instructions. For example, when patrons leave without completing a reservation, a client device can be used to inform the management system, which can provide updated instructions deleting tasks (or some tasks) associated with that reservation. As an additional example, when an item for delivery is ready earlier than expected, a client device can be used to inform the management system, which can provide updated instructions to the autonomous systems. Execution method 320 can then return to step 323, and the autonomous system can re-prioritize tasks.

In some instances, the autonomous system can locally address disruptions arising in the logistics environment. For example, when an autonomous system detects that a path is blocked, the autonomous system can determine, based on route information obtained from the management system (e.g., either in step 321 or in response to a request for such information at step 325) an alternative path. As an additional example, when two autonomous systems are blocking each other, they can communicate to determine which autonomous system has priority (e.g., based on the tasks being performed by the two systems). In some embodiments, the two systems can communicate with the management system to determine alternative routing. Alternatively, execution method 320 can then return to step 323, and the autonomous system(s) can re-prioritize tasks to perform tasks that can be performed.

In some embodiments, the autonomous systems can be coordinated with other production equipment and signals. In some embodiments, the logistics environment can be instrumented to detect task-relevant information. For example, the logistics environment can be instrumented with cameras. When a table is noted as vacated, based on image data obtained using the cameras, the management system can direct an autonomous system tasked with retrieving dirty crockery and cutlery to retrieve the dirty crockery and cutlery from that table. Additionally or alternatively, the management system can detect, using the cameras, obstructions (e.g., congregating patrons, spillages, furniture, or other obstructions) in specified routes. The management system can then provide instructions to autonomous system(s) to route around the detected obstructions (or provide instructions to an autonomous system or to a client device to address the obstruction). As another example, when a robotic cooking machine provides an indication that a food item has been completed, the management system can direct an autonomous system tasked with delivering food items to deliver that food item to the correct table.

In some embodiments, identifiers (e.g., visual identifiers, Bluetooth beacons, or the like) can be placed in, on, or under tables. Such identifiers can be readable to identify individual tables and changes in table location in a space. In some embodiments, the identifiers can be read by receivers (e.g., cameras, Bluetooth receivers, or the like) in the space (e.g., on a ceiling of the space). The identified locations of the tables can be used to map a table/furniture layout. For example, the identified locations can be used to determine the path of travel when the table/furniture layout has not been placed or moved to the location within the space, subspace or section specified by the spatial-temporal volume. As an additional example, the management system can provide instructions to a client device indicating the incorrect placement of the seating arrangement with respect to the allocated resource volume in the spatial-temporal volume for the logistics environment. In some embodiments, paths of travel for robot waiters can be determined using the layout. As may be appreciated the table layouts can be determined as described herein. In some embodiments, a geolocation apparatus can be installed within a logistics environment to detect changes in the location of tables, chairs, furniture, and other moveable items and send that information back to the management system to recalibrate paths and/or reassign tasks to autonomous systems. Such recalibration or reassignment can include determining when a task needs to be undertaken, such as, determining that people have finished eating or people have left the environment for a robot to be sent to clear a table.

In some embodiments, the geolocation apparatus can be used to determine if the floor plan has been changed in accordance disclosed embodiments so that changes can be applied to the autonomous systems, as manual delays may occur between when the changes in the floor plan were meant to be applied and when they were actually applied.

As may be appreciated, the methods disclosed in FIG. 3 proceed from resource requests to allocation of said requests, to determination of tasks and assignment of autonomous systems. However, the disclosed embodiments are not so limited. In some embodiments, autonomous systems can be at least partially assigned prior to the allocation of reservation requests. For example, an efficient route map can be determined by the management system. The efficient route map can be converted into spatial-temporal volumes. The management system can then treat these volumes as fixed and allocate requests within the voids between these volumes. In some embodiments, a backbone route map can be allocated first. The backbone route map can be selected to provide efficient access throughout the volume. Then requests can be allocated to volumes as described with regards to FIG. 3. Then "last mile" paths can be allocated that connect any unconnected task points with the backbone route.

Likewise, in some embodiments, characteristics other than party size or duration can be predetermined. In such embodiments, one or more volume allocations and routes can be predetermined, and reservations can be matched to the predetermined allocations. Such embodiments may be useful for events such as weddings or banquets, where the menu and timing are predetermined.

Figure 4A:
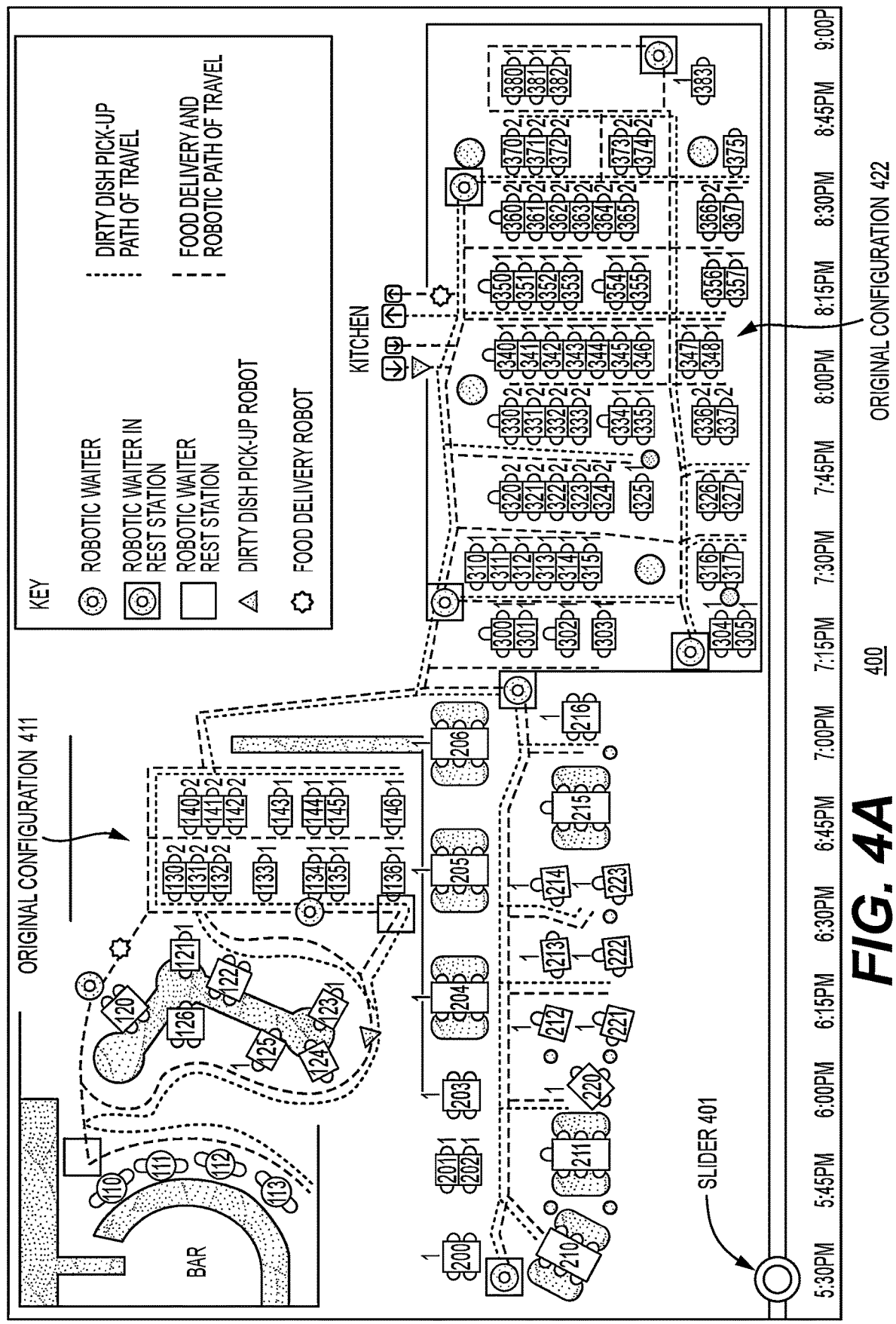
FIGS. 4A and 4B depict two views of a graphical user interface for managing a dynamically reconfigurable logistics system at different time-slices, consistent with disclosed embodiments.
Figure 4B:
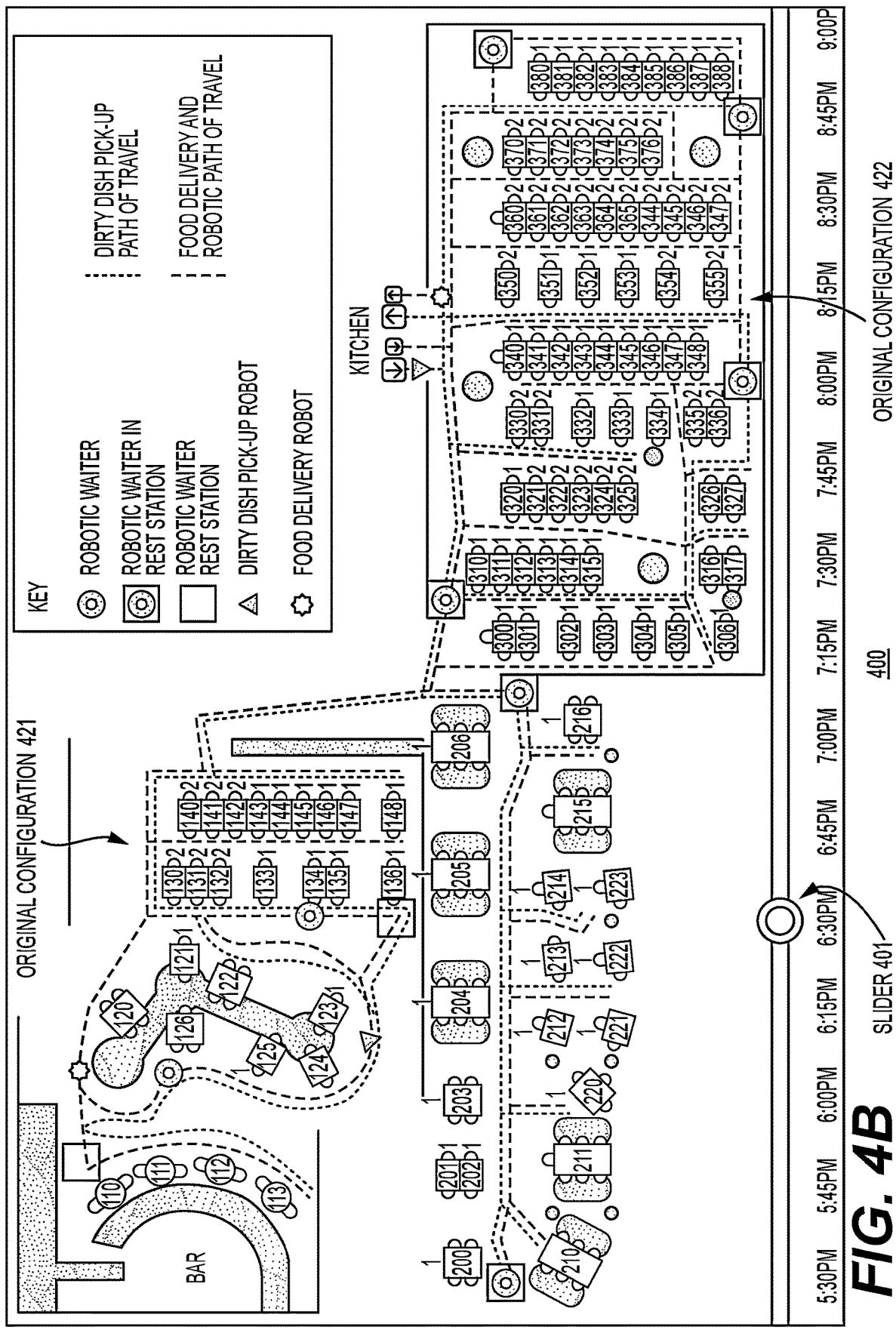

FIGS. 4A and 4B depicts two views of a graphical user interface 400 provided by a management system (e.g., management system 101, or the like) to a client device (e.g., one of client devices 104, or the like). The graphical user interface depicts the current status of the spatial-temporal volume for a time-slice of a logistics environment (e.g., in this case a restaurant). The time slice is selectable using slider 401. In FIG. 4A, the time-slice corresponds to the time 5:30 pm, while in FIG. 4B, the time slice corresponds to the time 6:30 PM.

Graphical user interface 400 can depict the paths for the robots configured to deliver food and the robots configured to retrieve dirty crockery and cutlery. In this example, these robots have different paths of travel (dotted lines for retrieval robots and broken lines for delivery robots) as they have different widths and hence different paths of travel. In this example, the path for the food delivery robot can be configured to reach each single chair at each table. However, in this example, the path for the retrieval robots need not reach each chair for each table. Similarly, the path of travel created for the retrieval robots is more discrete. The management system can also determine locations where the robotic waiters should "rest" when they are not needed. In some embodiments, the management system can place such locations where the robots can be quickly available if needed.

Figure 5A:
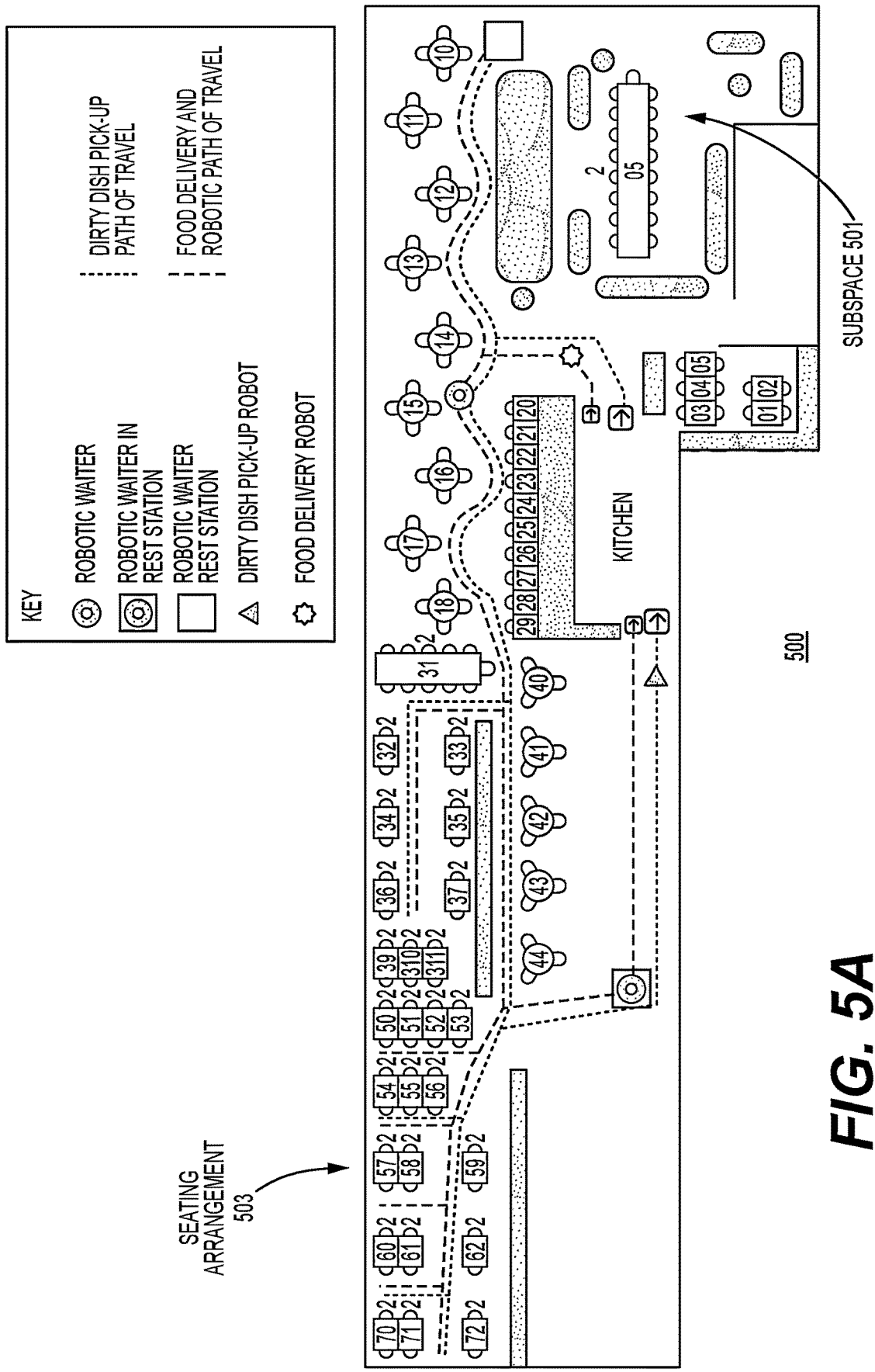
FIGS. 5A and 5B depict two views of a graphical user interface for managing a dynamically reconfigurable logistics system before and after receipt of multiple resource requests, consistent with disclosed embodiments.
Figure 5B:
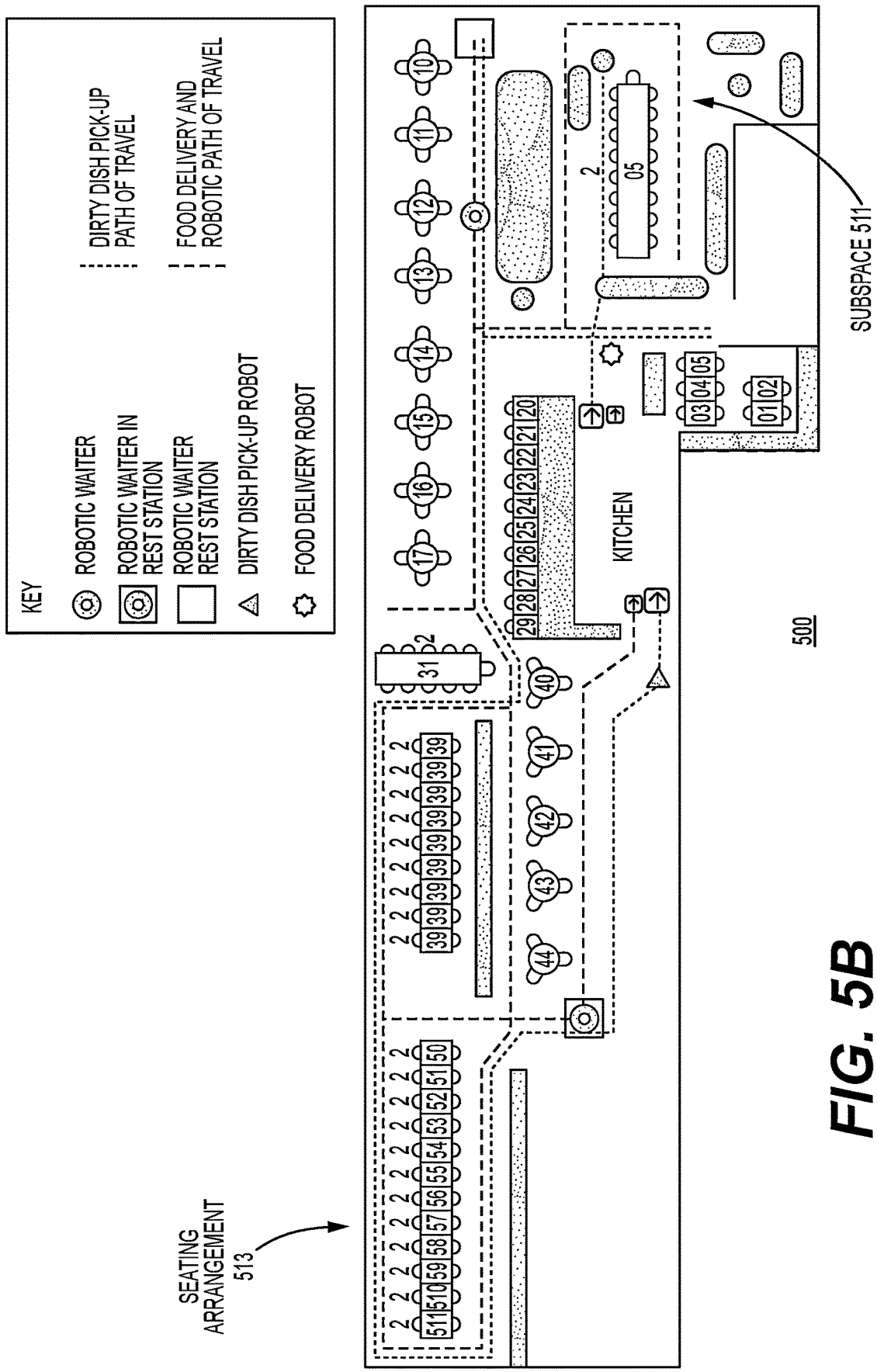

FIGS. 5A and 5B depicts two views of a graphical user interface 500 provided by a management system (e.g., management system 101, or the like) to a client device (e.g., one of client devices 104, or the like). The graphical user interface depicts a time slice of the spatial-temporal volume of a logistics environment (e.g., in this case a restaurant) before and after receipt of multiple reservation requests. In this example, the restaurant includes a specialty subspace (e.g., subspace 501). Originally, as depicted in FIG. 5A, no routes run through this subspace, as it is unused. Furthermore, seating arrangement 503 is configured for multiple parties of four patrons, with routes enabling each seat at each seating arrangement to be accessed by autonomous systems. The management system may then receive two large reservation requests (e.g., for parties of 24 and 18) and a reservation request for the specialty subspace. Following these requests, the management system can reconfigure the seating arrangement to generate seating arrangement 513, which includes two tables (for 24 and 18 patrons). Appropriate routes have been generated for these two, larger tables. Likewise, routes have been added for the specialty subspace 511.

Figure 6:
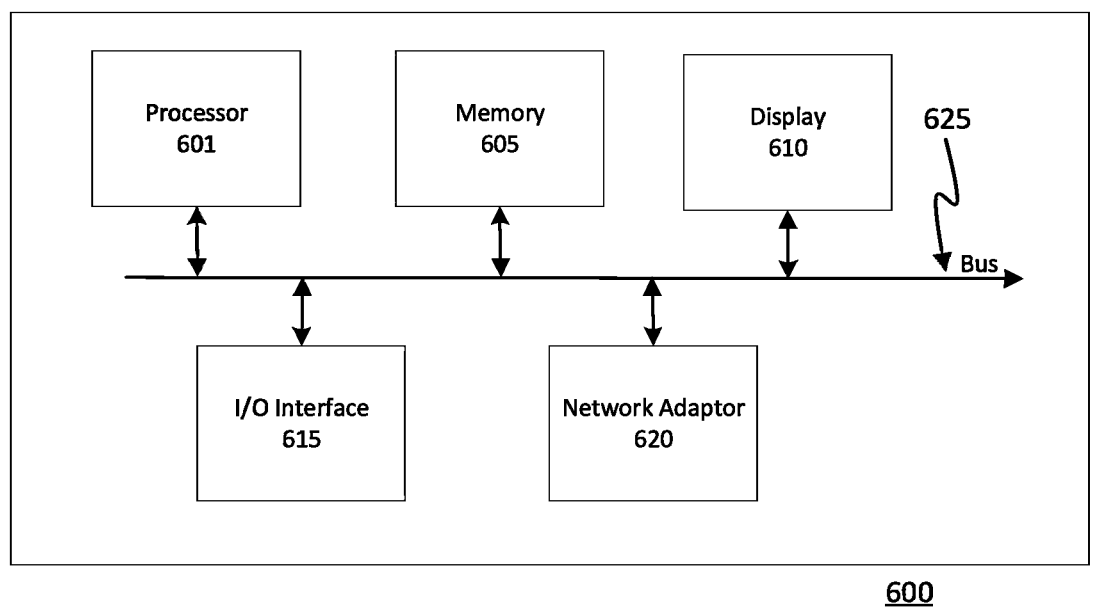
FIG. 6 depicts a schematic of exemplary computing system for performing the envisioned systems and methods, in accordance with disclosed embodiments.

FIG. 6 depicts a schematic of exemplary computing system 600 for performing the envisioned systems and methods, in accordance with disclosed embodiments. In some embodiments, computing system 600 can include a processor 601, memory 605, display 610, I/O interface(s) 615, and network adapter 620. These units may communicate with each other via bus 625, or wirelessly. The components shown in FIG. 6 may reside in a single device or multiple devices.

Consistent with disclosed embodiments, processor 601 may comprise a central processing unit (CPU), graphical processing unit (GPU), or similar microprocessor having one or more processing cores. Computing system 600 may include one or more processors 601 and may further operate with one or more other processors that are remote with respect to processors 601. Memory 605 may include non-transitory memory containing non-transitory instructions, such as a computer hard disk, random access memory (RAM), removable storage, or remote computer storage. In some aspects, memory 605 may be configured to store data and instructions, such as software programs. For example, memory 605 may be configured to store data and instructions. In some aspects, processor 601 may be configured to execute non-transitory instructions and/or programs stored on memory 605 to configure computing system 600 to perform operations of the disclosed systems and methods. In various aspects, as would be recognized by one of skill in the art, processor 601 may be configured to execute non-transitory instructions and/or programs stored on a remote memory to perform operations of the disclosed systems and methods.

Display 610 may be any device which provides a visual output, for example, a computer monitor, an LCD screen, etc. I/O interfaces 615 may include hardware and/or a combination of hardware and software for communicating information to computing system 600 from a user of computing system 600, such as a keyboard, mouse, trackball, audio input device, touch screen, infrared input interface, or similar device. Network adapter 620 may include hardware and/or a combination of hardware and software for enabling computing system 600 to exchange information using external networks, such as network 110. For example, network adapter 620 may include a wireless wide area network (WWAN) adapter, a Bluetooth module, a near field communication module, or a local area network (LAN) adapter.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed:

1. A system for management of a logistics environment, comprising:
   at least one processor; and
   at least one non-transitory, computer-readable medium containing instructions that, when executed by the at least one processor, cause the system to perform operations comprising:
      providing a graphical user interface to a client system, the graphical user interface including:
         a display of a time slice in a spatial-temporal volume corresponding to the logistics environment, the spatial-temporal volume containing resource allocation volumes, the spatial-temporal volume generated at least in part by:
            obtaining a resource request and generating a corresponding first resource allocation volume;
            allocating resource allocation volumes within the spatial-temporal volume, the resource allocation volumes including the first resource allocation volume; and
            determining a route map for autonomous systems based on the allocated resource allocation volumes;
         wherein the display of the time slice includes the resource allocation volumes intersecting the time slice and the route map intersecting the time slice; and
         a time control specifying a time of the time slice;
      detecting an interaction with the time control, the interaction specifying a new time; and
      automatically updating the display to depict a new time slice in the spatial-temporal volume.

2. The system of claim 1, wherein:
the route map depends on widths associated with the autonomous systems.

3. The system of claim 1, wherein:
determining the route map comprises:
   determining tasks associated with the resource allocation volumes; and
   assigning the autonomous systems to perform the tasks.

4. The system of claim 3, wherein:
determining the route map comprises determining that the assigned autonomous systems can reach primary or secondary task points associated with the tasks.

5. The system of claim 1, wherein:
determining the route map comprises assigning additional task points associated with the logistics environment.

6. The system of claim 1, wherein:
determining the route map comprises:
   determining high-traffic locations based on the resource allocation volumes; and
   routing the autonomous systems through the high-traffic locations.

7. The system of claim 1, wherein:
a spatial extent of the first resource allocation volume depends on a party size.

8. The system of claim 1, wherein:
a spatial extent or temporal extent of the first resource allocation volume depends on request characteristics.

9. The system of claim 1, wherein:
the operations further comprise detecting an interaction with a resource allocation volume displayed in the time slice; and
locking the resource allocation volume based on the detected interaction.

10. The system of claim 1, wherein:
allocating the resource allocation volumes within the spatial-temporal volume comprises:
   identifying unused and unlocked resource allocation volumes;
   pooling and sorting the first resource allocation volume and the unused and unlocked resource allocation volumes by allocation priority; and
   iteratively reallocating the pooled and sorted first resource allocation volume and unused and unlocked resource allocation volumes.

11. A system for management of a logistics environment, comprising:

at least one processor; and at least one non-transitory, computer-readable medium containing instructions that, when executed by the at least one processor, cause the system to perform operations comprising:

obtaining spatial information, resource information, and autonomous system information for a logistics environment;

generating a spatial-temporal volume for the logistics environment using the spatial information;

obtaining a resource request;

generating a resource allocation volume based on the resource request and the resource information;

generating a candidate updated spatial-temporal volume by allocating the resource allocation volume to a position in the spatial-temporal volume;

determining the candidate updated spatial-temporal volume satisfies an autonomous systems condition using the autonomous system information; and in response to the determination, updating the spatial-temporal volume based on the candidate updated spatial-temporal volume and providing instructions to one or more autonomous systems, the provided instructions including route information and task information for the one or more autonomous systems.

12. The system of claim 11, wherein:

generating the resource allocation volume comprises:

determining a spatial extent and temporal extent of the resource allocation volume based on resource request characteristics.

13. The system of claim 11, wherein:

the resource request specifies absolute or relative conditions on placement of the resource allocation volume in the spatial-temporal volume; and the candidate updated spatial-temporal volume satisfies the specified absolute or relative conditions.

14. The system of claim 11, wherein:

generating the candidate updated spatial-temporal volume comprises allocating pooled resource allocation volumes according to allocation priorities of the pooled resource allocation volumes; and an allocation priority of the resource allocation volume depends on resource request characteristics.

15. The system of claim 11, wherein:

The provided instructions correspond to a time slice and are provided upon beginning of the time slice.

16. The system of claim 11, wherein:

the provided instructions further include a path based on the task information and the route information.

17. The system of claim 11, wherein the operations further include:

receiving change information from a client system or detecting changes in the logistics environment; and providing, to an autonomous system of the one or more autonomous systems, additional instructions to update a path of the autonomous system based on the change information.

18. The system of claim 11, wherein:

the autonomous system information specifies the one or more autonomous systems;

tasks are associated with the resource allocation volume;

task points are associated with the tasks; and determining the candidate updated spatial-temporal volume satisfies the autonomous systems condition includes:

determining that each of the task points associated with each of the tasks can be reached by at least one of the one or more autonomous systems.

19. The system of claim 18, wherein:

the task points include primary and secondary task points; and determining that each of the task points associated with each of the tasks can be reached by the at least one of the one or more autonomous systems includes determining that a secondary task point can be reached when a primary task point cannot be reached.

20. A non-transitory, computer-readable medium containing instructions that, when executed by at least one processor of a system for management of a logistics environment, cause the system to perform operations comprising:

providing a graphical user interface to a client system, the graphical user interface including:

a display of a time slice in a spatial-temporal volume corresponding to the logistics environment, the spatial-temporal volume containing resource allocation volumes, the spatial-temporal volume generated at least in part by:

obtaining a resource request and generating a corresponding first resource allocation volume;

allocating resource allocation volumes within the spatial-temporal volume, the resource allocation volumes including the first resource allocation volume; and determining a route map for autonomous systems based on the allocated resource allocation volumes;

wherein the display of the time slice includes the resource allocation volumes intersecting the time slice and the route map intersecting the time slice; and a time control specifying a time of the time slice;

detecting an interaction with the time control, the interaction specifying a new time; and automatically updating the display to depict a new time slice in the spatial- temporal volume.

21. The non-transitory, computer-readable medium of claim 20, wherein:

the route map depends on widths associated with the autonomous systems.

22. The non-transitory, computer-readable medium of claim 20, wherein:

determining the route map comprises:

determining tasks associated with the resource allocation volumes; and assigning the autonomous systems to perform the tasks.

23. The non-transitory, computer-readable medium of claim 22, wherein:

determining the route map comprises determining that the assigned autonomous systems can reach primary or secondary task points associated with the tasks.

24. The non-transitory, computer-readable medium of claim 20, wherein:

determining the route map comprises assigning additional task points associated with the logistics environment.

25. The non-transitory, computer-readable medium of claim 20, wherein:

determining the route map comprises:

determining high-traffic locations based on the resource allocation volumes; and routing the autonomous systems through the high-traffic locations.

26. The non-transitory, computer-readable medium of claim 20, wherein:
   a spatial extent of the first resource allocation volume depends on a party size.

27. The non-transitory, computer-readable medium of claim 20, wherein:
   a spatial extent or temporal extent of the first resource allocation volume depends on request characteristics.

28. The non-transitory, computer-readable medium of claim 20, wherein:
   the operations further comprise detecting an interaction with a resource allocation volume displayed in the time slice; and
   locking the resource allocation volume based on the detected interaction.

29. The non-transitory, computer-readable medium of claim 20, wherein:
   allocating the resource allocation volumes within the spatial-temporal volume comprises:
      identifying unused and unlocked resource allocation volumes;
      pooling and sorting the first resource allocation volume and the unused and unlocked resource allocation volumes by allocation priority; and
      iteratively reallocating the pooled and sorted first resource allocation volume and unused and unlocked resource allocation volumes.

30. A non-transitory, computer-readable medium containing instructions that, when executed by at least one processor of a system for management of a logistics environment, cause the system to perform operations comprising:
   obtaining spatial information, resource information, and autonomous system information for the logistics environment;
   generating a spatial-temporal volume for the logistics environment using the spatial information;
   obtaining a resource request;
   generating a resource allocation volume based on the resource request and the resource information;
   generating a candidate updated spatial-temporal volume by allocating the resource allocation volume to a position in the spatial-temporal volume;
   determining the candidate updated spatial-temporal volume satisfies an autonomous systems condition using the autonomous system information; and
   in response to the determination, updating the spatial-temporal volume based on the candidate updated spatial-temporal volume and providing instructions to one or more autonomous systems, the provided instructions including route information and task information for the one or more autonomous systems.

31. The non-transitory, computer-readable medium of claim 30, wherein:
   generating the resource allocation volume comprises:
      determining a spatial extent and temporal extent of the resource allocation volume based on resource request characteristics.

32. The non-transitory, computer-readable medium of claim 30, wherein:
   the resource request specifies absolute or relative conditions on placement of the resource allocation volume in the spatial-temporal volume; and
   the candidate updated spatial-temporal volume satisfies the specified absolute or relative conditions.

33. The non-transitory, computer-readable medium of claim 30, wherein:
   generating the candidate updated spatial-temporal volume comprises allocating pooled resource allocation volumes according to allocation priorities of the pooled resource allocation volumes; and
   an allocation priority of the resource allocation volume depends on resource request characteristics.

34. The non-transitory, computer-readable medium of claim 30, wherein:
   the provided instructions correspond to a time slice and are provided upon beginning of the time slice.

35. The non-transitory, computer-readable medium of claim 30, wherein:
   the provided instructions further include a path based on the task information and the route information.

36. The non-transitory, computer-readable medium of claim 30, wherein the operations further include:
   receiving change information from a client system or detecting changes in the logistics environment; and
   providing, to an autonomous system of the one or more autonomous systems, additional instructions to update a path of the autonomous system based on the change information.

37. The non-transitory, computer-readable medium of claim 30, wherein:
   the autonomous system information specifies the one or more autonomous systems;
   tasks are associated with the resource allocation volume;
   task points are associated with the tasks; and
   determining the candidate updated spatial-temporal volume satisfies the autonomous systems condition includes:
      determining that each of the task points associated with each of the tasks can be reached by at least one of the one or more autonomous systems.

38. The non-transitory, computer-readable medium of claim 37, wherein:
   the task points include primary and secondary task points; and
   determining that each of the task points associated with each of the tasks can be reached by the at least one of the one or more autonomous systems includes determining that a secondary task point can be reached when a primary task point cannot be reached.

39. A method performed by a system for management of a logistics environment, the system including at least one processor, the method comprising:
   providing, using one or more of the at least one processor of the system, a graphical user interface to a client system, the graphical user interface including:
      a display of a time slice in a spatial-temporal volume corresponding to the logistics environment, the spatial-temporal volume containing resource allocation volumes, the spatial-temporal volume generated at least in part by:
         obtaining a resource request and generating a corresponding first resource allocation volume;
         allocating resource allocation volumes within the spatial-temporal volume, the resource allocation volumes including the first resource allocation volume; and
         determining a route map for autonomous systems based on the allocated resource allocation volumes;
      wherein the display of the time slice includes the resource allocation volumes intersecting the time slice and the route map intersecting the time slice; and a time control specifying a time of the time slice;
detecting, using one or more of the at least one processor of the system, an interaction with the time control, the interaction specifying a new time; and
automatically updating, using one or more of the at least one processor of the system, the display to depict a new time slice in the spatial-temporal volume.

40. The method of claim 39, wherein:
the route map depends on widths associated with the autonomous systems.

41. The method of claim 39, wherein:
determining the route map comprises:
    determining, using one or more of the at least one processor of the system, tasks associated with the resource allocation volumes; and
    assigning, using one or more of the at least one processor of the system, the autonomous systems to perform the tasks.

42. The method of claim 41, wherein:
determining the route map comprises determining, using one or more of the at least one processor of the system, that the assigned autonomous systems can reach primary or secondary task points associated with the tasks.

43. The method of claim 39, wherein:
determining the route map comprises assigning, using one or more of the at least one processor of the system, additional task points associated with the logistics environment.

44. The method of claim 39, wherein:
determining the route map comprises:
    determining, using one or more of the at least one processor of the system, high-traffic locations based on the resource allocation volumes; and
    routing, using one or more of the at least one processor of the system, the autonomous systems through the high-traffic locations.

45. The method of claim 39, wherein:
a spatial extent of the first resource allocation volume depends on a party size.

46. The method of claim 39, wherein:
a spatial extent or temporal extent of the first resource allocation volume depends on request characteristics.

47. The method of claim 39, wherein:
the method further comprises detecting, using one or more of the at least one processor of the system, an interaction with a resource allocation volume displayed in the time slice; and
locking, using one or more of the at least one processor of the system, the resource allocation volume based on the detected interaction.

48. The method of claim 39, wherein:
allocating the resource allocation volumes within the spatial-temporal volume comprises:
    identifying, using one or more of the at least one processor of the system, unused and unlocked resource allocation volumes;
    pooling and sorting, using one or more of the at least one processor of the system, the first resource allocation volume and the unused and unlocked resource allocation volumes by allocation priority; and
    iteratively reallocating, using one or more of the at least one processor of the system, the pooled and sorted first resource allocation volume and unused and unlocked resource allocation volumes.

49. A method performed by a system for management of a logistics environment, the system including at least one processor, the method comprising:
obtaining, using one or more of the at least one processor of the system, spatial information, resource information, and autonomous system information for the logistics environment;
generating, using one or more of the at least one processor of the system, a spatial-temporal volume for the logistics environment using the spatial information;
obtaining, using one or more of the at least one processor of the system, a resource request;
generating, using one or more of the at least one processor of the system, a resource allocation volume based on the resource request and the resource information;
generating, using one or more of the at least one processor of the system, a candidate updated spatial-temporal volume by allocating the resource allocation volume to a position in the spatial-temporal volume;
determining, using one or more of the at least one processor of the system, the candidate updated spatial-temporal volume satisfies an autonomous systems condition using the autonomous system information; and
in response to the determination, using one or more of the at least one processor of the system, updating the spatial-temporal volume based on the candidate updated spatial-temporal volume and providing instructions to one or more autonomous systems, the provided instructions including route information and task information for the one or more autonomous systems.

50. The method of claim 49, wherein:
generating the resource allocation volume comprises:
    determining, using one or more of the at least one processor of the system, a spatial extent and temporal extent of the resource allocation volume based on resource request characteristics.

51. The method of claim 49, wherein:
the resource request specifies absolute or relative conditions on placement of the resource allocation volume in the spatial-temporal volume; and
the candidate updated spatial-temporal volume satisfies the specified absolute or relative conditions.

52. The method of claim 49, wherein:
generating the candidate updated spatial-temporal volume comprises allocating, using one or more of the at least one processor of the system, pooled resource allocation volumes according to allocation priorities of the pooled resource allocation volumes; and
an allocation priority of the resource allocation volume depends on resource request characteristics.

53. The method of claim 49, wherein:
the instructions correspond to a time slice and are provided upon beginning of the time slice.

54. The method of claim 49, wherein:
the provided instructions further include a path based on the task information and the route information.

55. The method of claim 49, wherein the method further includes:
receiving, using one or more of the at least one processor of the system, change information from a client system or detecting changes in the logistics environment; and
providing, to an autonomous system of the one or more autonomous systems, using one or more of the at least one processor of the system, additional instructions to update a path of the autonomous system based on the change information.

56. The method of claim 49, wherein:
the autonomous system information specifies the one or more autonomous systems;

tasks are associated with the resource allocation volume;
task points are associated with the tasks; and
determining the candidate updated spatial-temporal volume satisfies the autonomous systems condition includes:
 determining, using one or more of the at least one processor of the system, that each of the task points associated with each of the tasks can be reached by at least one of the one or more autonomous systems.

57. The method of claim 56, wherein:
the task points include primary and secondary task points; and
determining that each of the task points associated with each of the tasks can be reached by the at least one of the one or more autonomous systems includes determining, using one or more of the at least one processor of the system, that a secondary task point can be reached when a primary task point cannot be reached.

\* \* \* \* \*